Aug. 14, 1962   B. W. GAMSON ETAL   3,049,399
COMPOSITION AND METHOD FOR DEODORIZING AIR
Filed Dec. 18, 1958
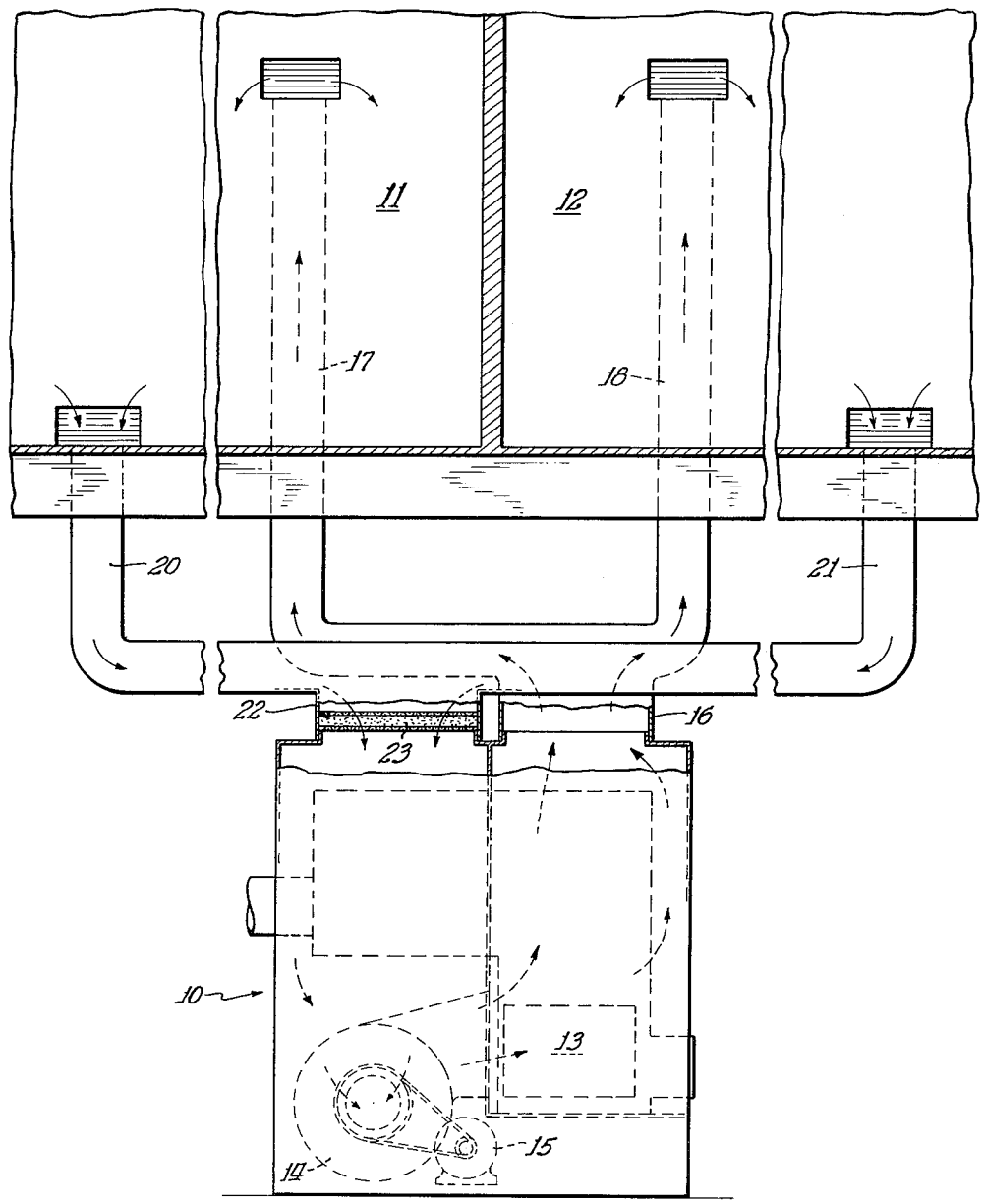
Inventors:
Bernard W. Gamson and
Richard L. Kuehner
By: W. S. McCurry Atty.

United States Patent Office 3,049,399
Patented Aug. 14, 1962

3,049,399
COMPOSITION AND METHOD FOR
DEODORIZING AIR
Bernard W. Gamson, Lincolnwood, and Richard L. Kuehner, Roselle, Ill., assignors to Borg-Warner Corporation, Chicago, Ill., a corporation of Illinois
Filed Dec. 18, 1958, Ser. No. 781,321
16 Claims. (Cl. 21—53)

The present invention relates to the purification of air in enclosed spaces and more particularly relates to a composition and method for deodorizing air.

A process for deodorizing air by bringing the air in intimate contact with a spray of an aqueous solution of potassium permanganate is disclosed in Kuehner Patent No. 2,683,074. It has been found that while the potassium permanganate in aqueous solution totally removes all odors in the heaviest of smoke filled rooms, this aqueous system has certain disadvantages such as the handling of the aqueous solution by pumps and conduits; the required size of the unit; and servicing problems.

It is an object of the present invention to provide a composition of matter which can be placed in an air stream for deodorizing the air, which composition is devoid of the aforementioned objections and which is just as effective as the aqueous spray to remove odors from enclosed spaces.

Another object of the invention is to provide a method for using the composition of matter in an air stream.

We have found that air can be passed through a bed of chemically treated solid materials, completely eliminating the problems encountered with a liquid spray. The bed of chemicals comprises an activated hydrophilic, water adsorbing substrate having a permanganate deposited in the pores thereof. The substrates found suitable for use in the present method are silica gel, alumina, silica-alumina, activated bauxite, and activated clays. Permanganates which we have found suitable are the permanganates of potassium, sodium, magnesium, calcium, barium, and lithium.

It is well known to use activated materials such as activated charcoal in an air stream in an attempt to remove odors. However, such materials are not entirely satisfactory for their intended purpose. Odors are adsorbed onto and into the pores of the charcoal. These adsorbed odors are desorbed to varying degrees by such conditions as temperature changes, the super saturation of the adsorptive surfaces, and by preferentially adsorbed gases and vapors. This action occurs to a greater or lesser degree with all adsorbent materials resulting in the production of a desorbed odor complex atypical of the original adsorbed odor.

Our invention prevents this off odor desorption by the destruction of the adsorbed odors sometimes following adsorption and before the desorption. This is accomplished by the permanganate which has been deposited in the pores of the adsorptive material. We do not know the precise reaction but believe it to be somewhat as follows when potassium permanganate, for example, is the oxidant:

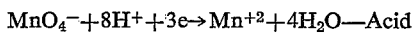
$MnO_4^- + 8H^+ + 3e \rightarrow Mn^{+2} + 4H_2O$—Acid

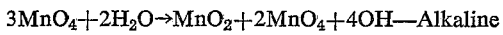
$3MnO_4^- + 2H_2O \rightarrow MnO_2 + 2MnO_4 + 4OH$—Alkaline

$MnO_4^- + 4H^+ + 3e \rightarrow MnO_2 + 2H_2O$—Neutral

Because of the diversity of odors, an exact deodorization reaction cannot be predicted. However, we do know that the permanganate oxidizes the major odors, e.g., tobacco, body, and cooking odors, to carbon dioxide, water or some other odorless oxidation product.

Water in the substrate is necessary for the oxidation reaction to take place. It has been found that the amount of water necessary to cause the reaction is supplied by a normal ambient humidity of the enclosed space. Without water, the permanganate will not ionize to release the active permanganate ion. It is for this reason that we employ a hydrophilic substrate.

In the accompanying drawing, we have illustrated our bed of solid chemicals applied to an air conditioned system but it is not our intention to limit the invention to any particular system. In the drawing:

The single figure is a diagrammatic view of an air conditioning system for an enclosed space which employs our bed of chemicals for removing odors from the enclosed space.

In the drawing, there is disclosed a heat exchanger assembly 10 located in the basement of a house, for example, and adapted to air condition rooms or spaces 11 and 12. The assembly 10 comprises a heat exchange element 13 which may be a heating or cooling element, and a blower 14, driven by an electric motor 15, for passing air over the heat exchange element 13 into an outlet 16 for distribution to the rooms 11 and 12 by means of the ducts 17 and 18 respectively. Ducts 20 and 21 are provided for returning air from the rooms to an inlet duct 22 of the heat exchanger assembly 10. A filter bed 23 is disposed within the inlet duct 22. The filter bed 23 comprises a porous container filled with loosely packed adsorbent material which has been treated with a permanganate in accordance with our invention.

In operation, the odor-filled air which is drawn from the rooms 11 and 12 through the inlet 22 passes through the filter bed 23 where the odors are adsorbed by the bed and oxidized by the permanganate as heretofore explained.

The composition of the present invention is preferably packed loosely in a filter-type bed. However, other methods can obviously be employed to bring the odor filled air into contact with the treated surfaces of the adsorbent material, such as the use of a fluidized bed of the solid materials or the impingement of air on the solid materials.

Various methods may be employed to deposit the permanganate in the pores and on the surfaces of activated adsorbent. In one method, the adsorbent is impregnated with a 5% aqueous solution of the permanganate and dried. Among other methods for preparing the compositions are the mixing of the dry materials and the coprecipitation of the compounds.

Generally, the life of the filter bed of the present invention is determined by the amount of oxidizing material and the conditions of the space being deodorized. A representative example of a filter bed made in accordance with this invention is 20 x 20 inch bed having a one-half inch thickness of alumina and weighing six pounds. The alumina is impregnated with a 5% solution of potassium permanganate. When employed in the system shown in the drawing figure and wherein the room 10 was a residence of relatively high odor content, this bed removed 50% of the odors passing through it and reduced ambient odor conditions by 75%. The life of this particular bed was three months. A longer life is had when the ventilating system is not subjected to heavy smoke and odors. A 50% removal efficiency is adequate for most human comfort deodorization. Where greater efficiency is desired, this can be accomplished by thicker deodorant beds or lower air velocity. In any event, the bed is placed in an easily accessible position in the air circulating system and is replaced when it becomes ineffecitve to remove the smoke and odors from the system.

While the present invention has been described in connection with certain specific embodiments thereof, it is to be understood that this is by way of illustration and not by way of limitation and the scope of our invention is defined solely by the appended claims which should be construed as broadly as the prior art will permit.

It should be apparent to those skilled in the art that the compositions and method of the present invention lend themselves to applications other than the deodorization of residences, such as the treatment of exhaust gases from internal combustion engines, the deodorization of spaces in which foods are stored, and in fact, the invention may be employed in any system where deodorization is desired.

We claim:
1. A composition of matter for deodorizing air comprising an inorganic activated water adsorbing substrate impregnated with a permanganate.
2. A composition of matter for deodorizing air comprising an inorganic activated water adsorbing substrate selected from the group consisting of silica gel, alumina, silica-alumina, activated bauxite, and activated clays impregnated with a permanganate.
3. A composition of matter for deodorizing air comprising an inorganic activated water adsorbing substrate selected from the group consisting of silica gel, alumina, silica-alumina, activated bauxite, and activated clays impregnated with a permanaganate selected from the group consisting of the permanganates of potassium, sodium, magnesium, calcium, barium and lithium.
4. A composition of matter for deodorizing air comprising an inorganic activated water adsorbing substrate impregnated with magnesium permanganate.
5. A composition of matter for deodorizing air comprising an inorganic activated water adsorbing substrate impregnated with sodium permanganate.
6. A composition of matter for deodorizing air comprising an inorganic activated water adsorbing substrate impregnated with calcium permanganate.
7. A composition of matter for deodorizing air comprising an inorganic activated water adsorbing substrate impregnated with barium permanganate.
8. A composition of matter for deodorizing air comprising an inorganic activated water adsorbing substrate impregnated with potassium permanganate.
9. A composition of matter for deodorizing air comprising an inorganic activated water adsorbing substrate impregnated with lithium permanganate.
10. A composition of matter for deodorizing air comprising silica gel impregnated with a permanganate.
11. A composition of matter for deodorizing air comprising alumina impregnated with a permanganate.
12. A composition of matter for deodorizing air comprising silica alumina impregnated with a permanganate.
13. A composition of matter for deodorizing air comprising activated bauxite impregnated with a permanganate.
14. A composition of matter for deodorizing air comprising an activated clay impregnated with a permanganate.
15. A process for deodorizing air which comprises bringing the odor containing air in contact with an inorganic activated water adsorbing substrate containing a permanganate.
16. A process for deodorizing air which comprises bringing the odor containing air in contact with alumina containing potassium permanganate.

References Cited in the file of this patent
UNITED STATES PATENTS

| | | |
|---|---|---|
| 552,142 | Purves | Dec. 31, 1895 |
| 1,716,479 | Bilsky | June 11, 1929 |
| 1,716,481 | Bilsky | June 11, 1929 |